May 15, 1934.   I. L. EASTMAN   1,958,786
NONDRIP SHUT-OFF NOZZLE
Filed Sept. 6, 1932
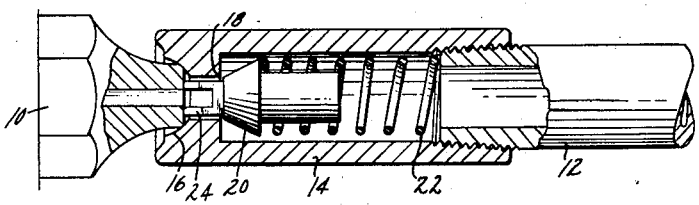
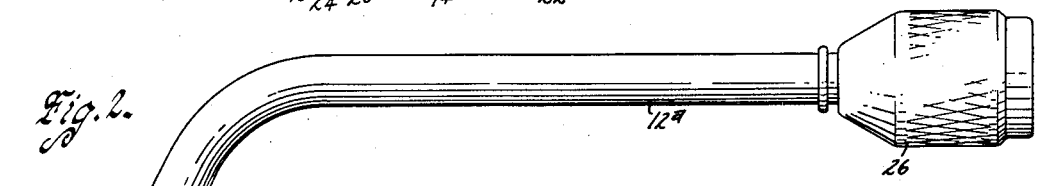
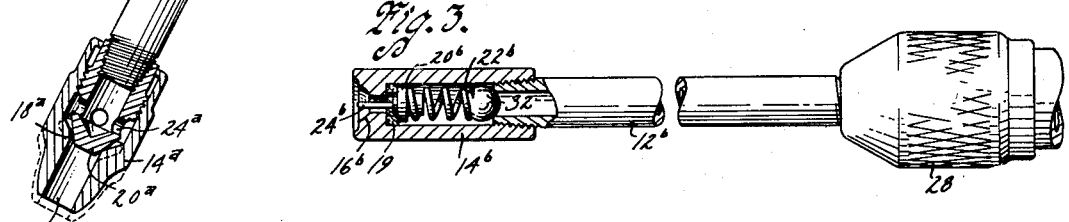
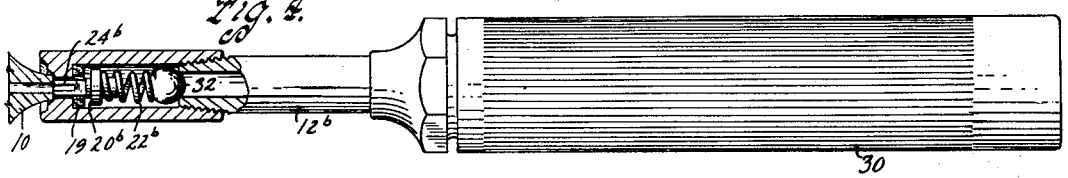
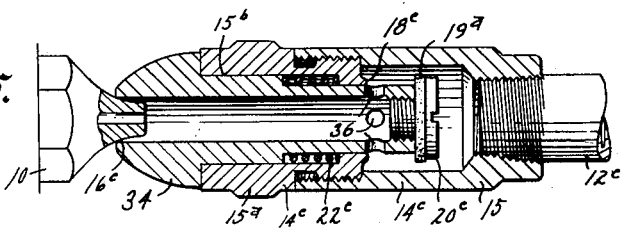
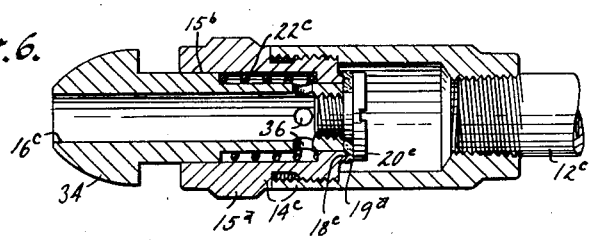
Witness
H. S. Mangenmaier
Inventor
Ivan L. Eastman
By Bair, Freeman & Sinclair
Attorneys Patented May 15, 1934

1,958,786

UNITED STATES PATENT OFFICE 1,958,786

NONDRIP SHUT-OFF NOZZLE

Ivan L. Eastman, Bryan, Ohio, assignor to The Aro Equipment Corporation, Bryan, Ohio, a corporation of Ohio Application September 6, 1932, Serial No. 631,949

3 Claims. (Cl. 284—18)

An object of my invention is to provide non-drip shut-off nozzles for lubricant and the like, which are of durable, simple and inexpensive construction.

A further object is to provide non-drip shut-off nozzles which may be associated with lubricant delivery pipes of various kinds and which are adapted to coact with lubricant receiving fittings in such a way that after lubricant has been supplied from the lubricant pipe to the lubricant receiving fitting, the nozzle can be either manually operated or will be automatically operated to shut off the supply of lubricant through the nozzle and thus provide a non-drip nozzle or one from which lubricant does not drip after the lubricating operation.

More particularly it is my object to provide a non-drip shut-off nozzle comprising a pair of members relatively movable, one of which has a valve seat and the other a valve plug for normal coaction with each other but which may be separated for permitting flow of lubricant through the nozzle when it is desired to introduce lubricant to a lubricant receiving fitting.

Still a further object is to provide one form of the invention in which the valve plug is normally constrained to remain in non-drip shut-off position and to be opened by contact with the lubricant receiving fitting.

Still a further object is to provide one form of the invention in which the device can be opened or closed manually.

Still another object is to provide a nozzle consisting of two parts telescopically mounted relative to each other and spring extended, one of the parts being adapted to receive lubricant and the other adapted to coact with a lubricant receiving fitting for introducing lubricant thereto.

With these and other objects in view my invention consists in the construction, arrangement and combination of the various parts of my device, whereby the objects contemplated are attained as hereinafter set forth, pointed out in my claims, and illustrated in the accompanying drawing, in which:—

Figure 1 is an enlarged sectional view of a non-drip shut-off nozzle embodying my invention.

Figure 2 is a sectional view of a slightly modified form showing it applied to a bent delivery pipe whereby the entire device illustrated in Figure 2 constitutes a direct delivery nozzle.

Figures 3 and 4 show a still further modified form of the invention applied to different lubricant delivery pipes and the assemblies of Figures 3 and 4 constitute respectively, plain nozzle and push booster nozzle assemblies; and Figures 5 and 6 are enlarged views of a slightly different type of the non-drip shut-off nozzle.

On the accompanying drawing I have used the reference numeral 10 to indicate a lubricant receiving fitting. The reference numeral 12 indicates generally a lubricant delivery pipe. The form of invention shown in Figure 1 comprises a casing 14 screwthreadedly coacting with the delivery pipe 12 and having a concaved seat 16 to engage the fitting 10.

The casing 14 has a valve seat indicated at 18. Normally coacting with the valve seat 18 is a valve plug 20, a spring 22 being provided for the purpose of causing such normal coaction. The valve plug 20 has prongs 24 adapted to engage the end of the fitting 10 to raise the plug 20 from the seat 18 whenever the concaved end 16 of the casing 14 is associated with the fitting.

From the description thus far it will be obvious that the valve plug 20 is normally seated by the spring 22 thus shutting off any flow of lubricant from the pipe 12 through the casing 14. This makes the nozzle comprised of the casing 14, the plug 20 and the spring 22 a non-drip nozzle since the lubricant cannot drip from the end of it when removed from the fitting 10.

When the nozzle, however, is engaged with the fitting for supplying lubricant thereto, the plug 20 is automatically raised from its seat to permit the flow of lubricant.

In Figure 2 I have shown a casing 14a and a valve plug 20a. The casing 14a has a bore 16a adapted to coact with the lubricant fitting 10 the same as illustrated in Figure 5. The plug 20a is screw threaded on the delivery pipe 12a while the casing 14a is screw threaded on the plug 20a. The casing and the plug are thus relatively movable by manually rotating the casing on the plug. Rotation in one direction will cause the plug to be seated against the valve seat 18a while rotation in the opposite direction will open the valve as shown by dotted lines. Openings 24 are provided in the plug member 20a to permit the flow of lubricant from the plug member and then between the plug member and the valve seat 18a. This type of device is manually rather than automatically openable and must be manually closed to accomplish shutting off and prevent dripping.

In Figures 3 and 4 parts similar to the parts in Figure 1 are given the same reference numerals with the addition of the distinguishing characteristic b. Different types of connectors 26, 28 and 30 are provided on the lubricant delivery pipes 12a and 12b but these form no part of my present invention. They merely illustrate that the various types of non-drip shut-off nozzles which I show can be associated with different types of lubricant delivery devices.

In the form of invention shown in Figures 3 and 4 a valve washer 19 is interposed between the valve seat 18b and the valve plug 20b. This may be made of leather, composition or the like. An additional feature of Figures 3 and 4 is a check ball 32 adapted to engage the end of the lubricant pipe 12b, the spring 22b serving the double purpose of normally holding the valve plug 20b seated and the check ball 32 seated. The check ball of course will open when the lubricant is supplied under sufficient pressure to overcome the tension of the spring 22b.

In Figures 5 and 6 I have shown a casing 14c formed of two separate parts 15 and 15a. These are assembled together by screw threads. A valve washer 19a is interposed between the valve plug 20c and the valve seat 18c, the plug 20c being merely a screw threaded into the end of a lubricant fitting engager 34. The engager 34 is telescopically mounted in a bore 15b of the part 15a. The spring 22c is interposed between a shoulder of the engager 34 and a shoulder of the part 15a. The engager 34 has openings 36 to permit the passage of lubricant when the parts are in the lubricating position of Figure 5. The parts normally assume the position of Figure 6 due to the spring 22c expanding, this position being the non-drip shut-off position of the nozzle.

In all forms of my invention the prime object of parts engaging each other to shut off the flow of lubricant through the nozzle when it is not performing a lubricating operation is carried out. The parts are openable during the lubricating operation either manually as shown in Figure 2 or automatically as shown in the other figures of the drawing.

Changes such as illustrated and others may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a non-drip shut-off nozzle, a casing having a bore and a reduced valve seat inward thereof, a hollow valve plug movable relative to said seat and having a piston portion in said bore, spring means normally causing said valve plug to engage said valve seat to shut off flow of lubricant to said nozzle, means on said valve plug to engage a lubricant receiving fitting to thereby disengage said valve plug from said valve seat when said nozzle is associated with such a fitting and means of communication between said bore of said casing and the interior of said valve plug when said plug is seated.

2. In a non-drip shut-off nozzle, a casing having a bore and a reduced shoulder inward thereof terminating in a valve seat, a hollow valve plug movable relative to said valve seat and having a piston portion in said bore, spring means normally causing said valve plug to engage said valve seat to shut off flow of lubricant to said nozzle, means on said valve plug to engage a lubricant receiving fitting to thereby disengage said valve plug from said valve seat when said nozzle is associated with such a fitting and means of communication between said bore of said casing and the interior of said valve plug when said plug is seated.

3. In a non-drip shut-off nozzle, a casing having a bore and a reduced shoulder inward thereof terminating in a valve seat, a hollow valve plug movable relative to said valve seat and having a piston portion in said bore, means normally causing said valve plug to engage said valve seat to shut off flow of lubricant to said nozzle, means on said valve plug to engage a lubricant receiving fitting to thereby disengage said valve plug from said valve seat when said nozzle is associated with such a fitting and means of communication between said bore of said casing and the interior of said hollow valve plug as said plug is seated.

IVAN L. EASTMAN.